United States Patent
Martino González et al.

(10) Patent No.: US 10,878,791 B2
(45) Date of Patent: Dec. 29, 2020

(54) ENERGY ABSORBING STRUCTURE FOR ATTENUATING THE ENERGY TRANSMITTED FROM AN ENERGY SOURCE

(71) Applicant: Airbus Operations S.L., Getafe (ES)

(72) Inventors: Esteban Martino González, Getafe (ES); Javier Toral Vazquez, Getafe (ES)

(73) Assignee: Airbus Operations S.L., Getafe (ES)

( * ) Notice: Subject to any disclaimer, the term of this patent is extended or adjusted under 35 U.S.C. 154(b) by 364 days.

(21) Appl. No.: 15/845,281

(22) Filed: Dec. 18, 2017

(65) Prior Publication Data

US 2018/0174565 A1    Jun. 21, 2018

(30) Foreign Application Priority Data

Dec. 20, 2016 (EP) .................................. 16382622

(51) Int. Cl.
    *G10K 11/16*    (2006.01)
    *G10K 11/168*   (2006.01)
    (Continued)

(52) U.S. Cl.
    CPC .............. *G10K 11/002* (2013.01); *B32B 3/12* (2013.01); *F16F 7/121* (2013.01)

(58) Field of Classification Search
    CPC .. G10K 11/002; G10K 11/168; G10K 11/162; G10K 11/16; B32B 3/12;
    (Continued)

(56) References Cited

U.S. PATENT DOCUMENTS 5,087,491 A * 2/1992 Barrett ..................... B32B 7/02
                                                  428/34.5
6,110,985 A * 8/2000 Wheeler ................... B32B 5/18
                                                   521/83
(Continued)

FOREIGN PATENT DOCUMENTS

CN    104763772    7/2015
CN    204592130    8/2015
(Continued)

OTHER PUBLICATIONS

European Search Report, dated Jun. 2, 2017, priority document.

*Primary Examiner* — Edgardo San Martin
(74) *Attorney, Agent, or Firm* — Greer, Burns & Crain, Ltd.

(57) ABSTRACT

An energy absorbing structure for attenuating energy received from an energy source. The structure comprises a deformable structure formed by an ensemble of one or more first layers of a material having a positive Poisson's ratio, one or more second layers of a material having a negative Poisson's ratio and one or more third layers of an elastomeric material placed between a first layer and a second layer. The ensemble is arranged with the one or more third layers joined to the first and second layers for absorbing at least part of the energy through shear forces or a combination of traction and compression forces applied to the ensemble by the first and second layers as a consequence of their differential deformation after receiving the energy.

23 Claims, 12 Drawing Sheets

(51) Int. Cl.
  *G10K 11/162* (2006.01)
  *B32B 7/02* (2019.01)
  *B32B 7/022* (2019.01)
  *F16F 15/02* (2006.01)
  *F16F 15/04* (2006.01)
  *G10K 11/00* (2006.01)
  *B32B 3/12* (2006.01)
  *F16F 15/08* (2006.01)
  *F16F 7/12* (2006.01)

(58) Field of Classification Search
  CPC .... B32B 7/02; B32B 7/022; F16F 7/12; F16F 7/121; F16F 15/02; F16F 15/04; F16F 15/08
  See application file for complete search history.

(56) References Cited

U.S. PATENT DOCUMENTS

| | | | |
|---|---|---|---|
| 6,179,086 B1 * | 1/2001 | Bansemir | G10K 11/172 181/198 |
| 7,160,621 B2 | 1/2007 | Chaudhari et al. | |
| 7,896,294 B2 | 3/2011 | Dittrich | |
| 8,127,889 B1 * | 3/2012 | Mathur | B64C 1/40 181/290 |
| 9,382,962 B2 | 4/2016 | Scaroa et al. | |
| 9,995,359 B2 * | 6/2018 | Martino Gonzalez | F16F 7/00 |
| 10,066,508 B2 * | 9/2018 | Geiger | F01D 25/24 |
| 2006/0208135 A1 * | 9/2006 | Liguore | B29C 70/088 244/117 R |
| 2010/0040815 A1 | 2/2010 | Tiwari et al. | |
| 2011/0233335 A1 | 9/2011 | Vinue et al. | |
| 2012/0315456 A1 * | 12/2012 | Scarpa | B32B 3/12 428/221 |
| 2013/0264757 A1 * | 10/2013 | Rajasekaran | F16F 7/00 267/141 |
| 2016/0177567 A1 | 6/2016 | Gandhi | |
| 2019/0202163 A1 * | 7/2019 | Yeh | B32B 3/08 |
| 2019/0271237 A1 * | 9/2019 | Martin | F01D 25/26 |

FOREIGN PATENT DOCUMENTS

| | | |
|---|---|---|
| CN | 103573891 | 4/2016 |
| DE | 102013226573 | 6/2015 |
| ES | 221586 | 10/1976 |
| ES | 2398287 | 3/2013 |
| FR | 2971233 | 8/2012 |
| WO | 2010019583 | 2/2010 |

* cited by examiner

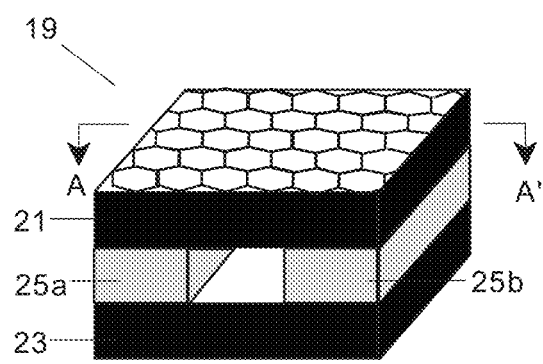 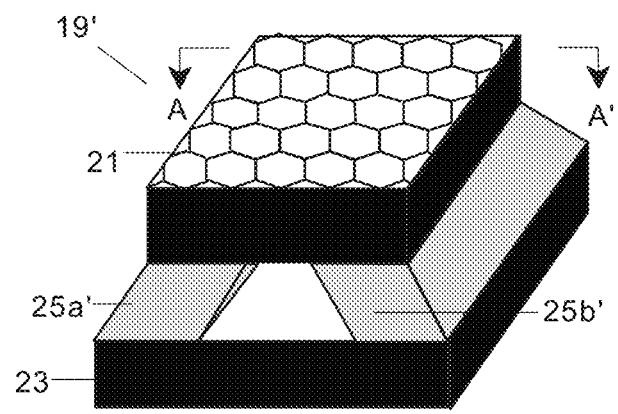
FIG. 6a          FIG. 6b
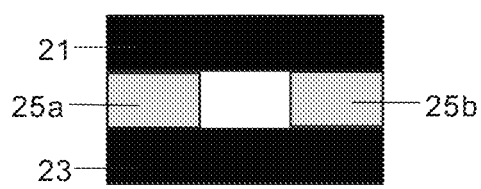 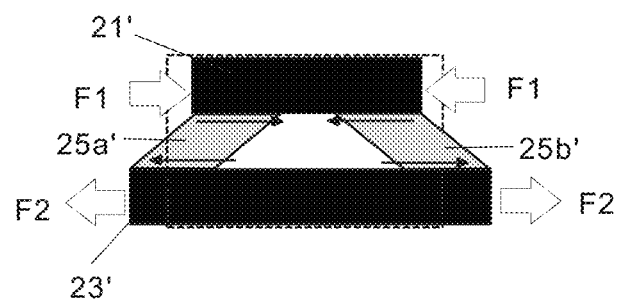
FIG. 7a          FIG. 7b
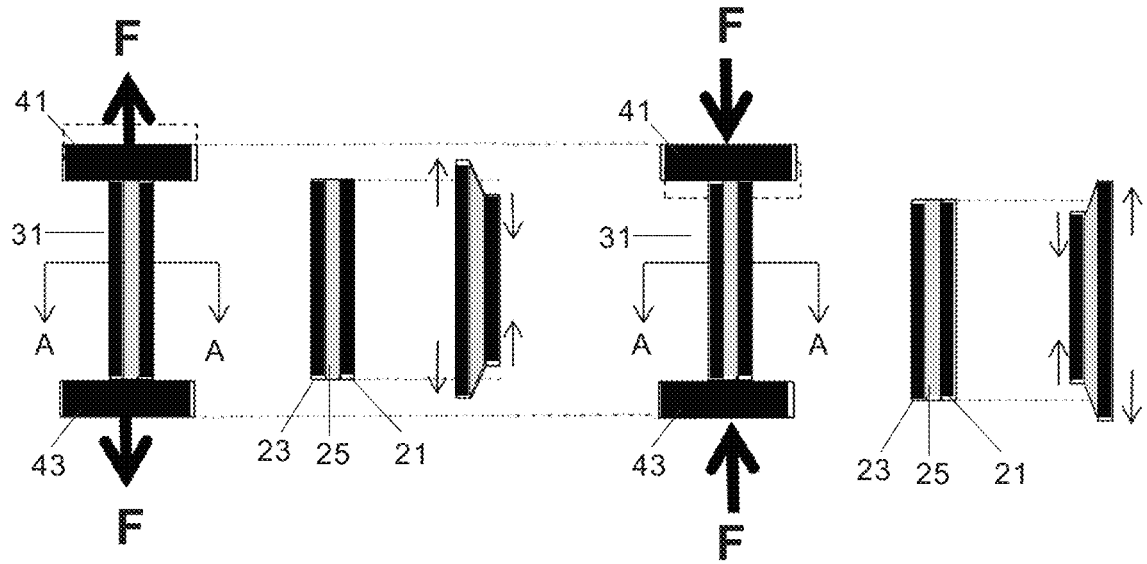
FIG. 8a

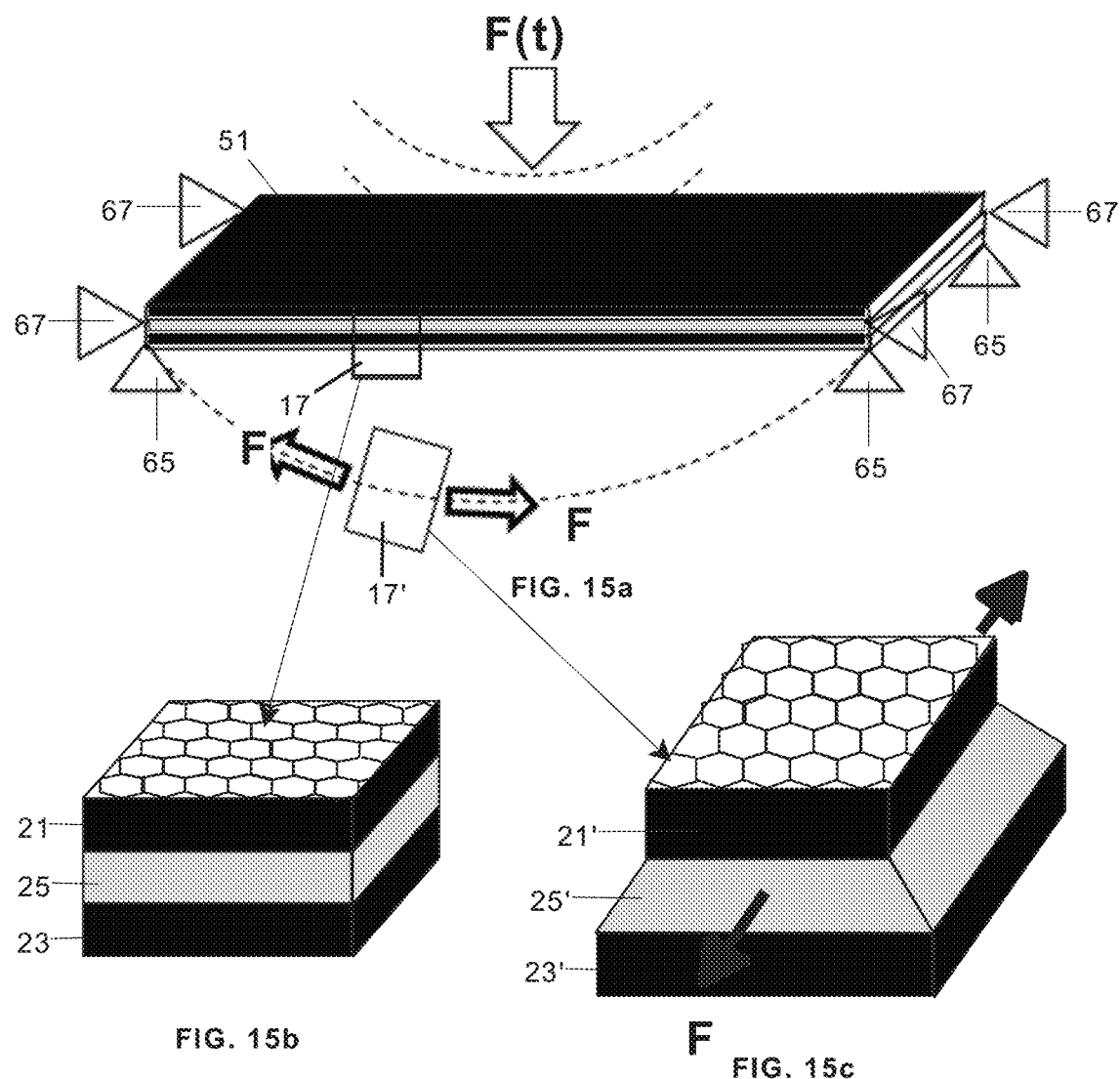
FIG. 15a
FIG. 15b
FIG. 15c
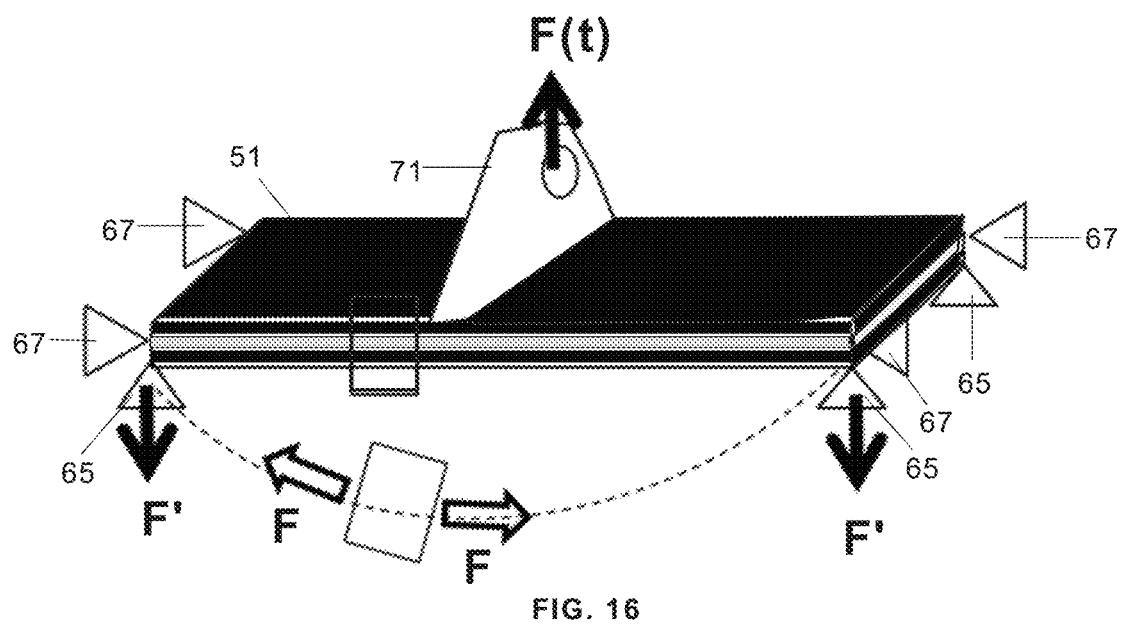
FIG. 16

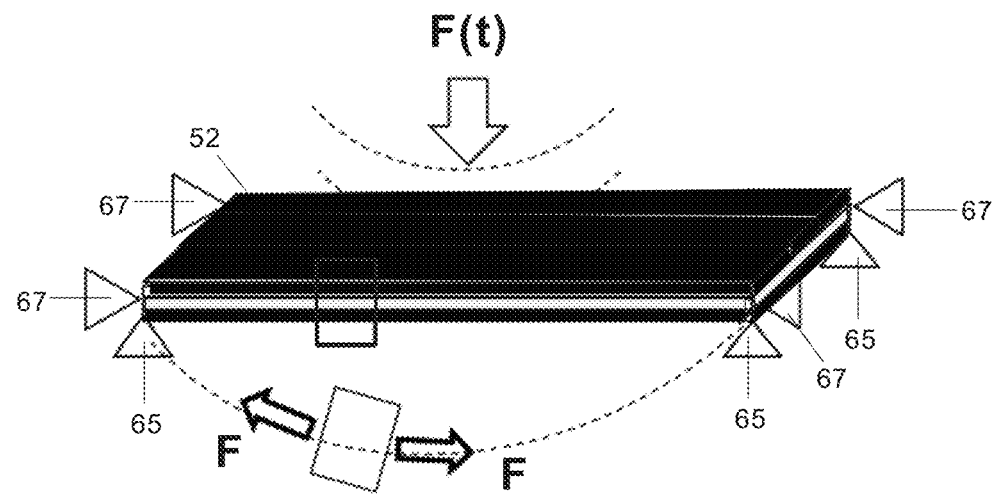
FIG. 17
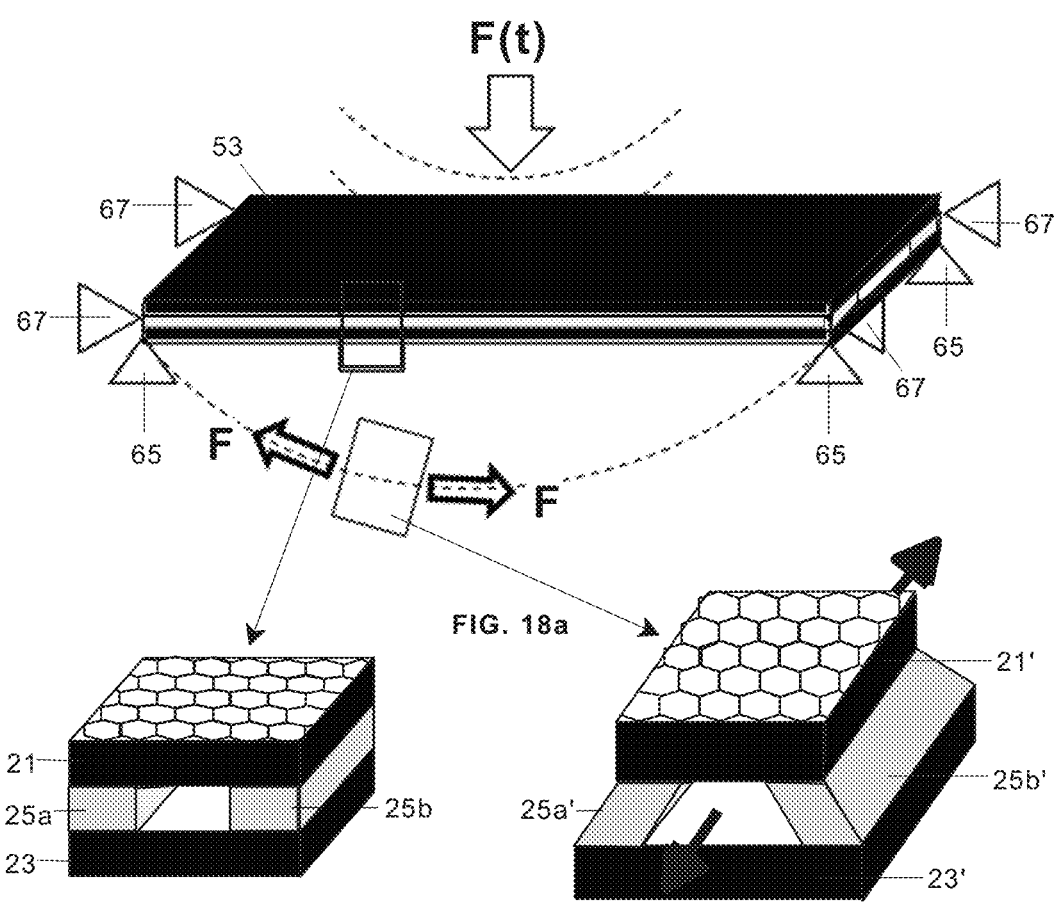
FIG. 18a
FIG. 18b
FIG. 18c

ENERGY ABSORBING STRUCTURE FOR ATTENUATING THE ENERGY TRANSMITTED FROM AN ENERGY SOURCE

CROSS-REFERENCES TO RELATED APPLICATIONS

This application claims the benefit of the European patent application No. 16382622.5 filed on Dec. 20, 2016, the entire disclosures of which are incorporated herein by way of reference.

FIELD OF THE INVENTION

The present invention relates to structures capable of absorbing energy from energy sources such as a mechanical or an acoustic impact or a mechanical or an acoustic vibration.

BACKGROUND OF THE INVENTION

In the aerospace industry there is a need for structures able to withstand mechanical impacts and several proposals thereof are known. For example, the document ES 2 398 287 A1 describes an impact resistant and damage tolerant fuselage part comprising a skin, a plurality of frames arranged perpendicular to the longitudinal axis of the fuselage and also an upper longitudinal box, with or without internal divisions, and a bottom longitudinal box, with or without internal divisions, that are configured to form together with the skin a multi-cell structure, belonging, in each cell, the outer side to the skin and the inner sides to the longitudinal boxes. The part also comprises a plurality of lateral beams which are interconnected with the frames to form a structural unit with the skin. The components are dimensioned so that the aircraft can cope with, for example, mechanical impacts from detached parts of aircraft engines to maintain a sufficient number of closed cells.

Regarding noise impacts, ES 2 221 586 A1 discloses the use of micro-perforated panels (MPP's) for skins in transportation means such as cars, trains, boats and planes. They are panels of thickness t in the range $0.2 \leq t \leq 5$ mm, perforation diameter d in the range $0.05 \leq d \leq 2$ mm, and perforation percentages in the range p $0.2 \leq p \leq 4\%$. The air cavity, in this case, may be filled with foam or wadding.

Thus, the solutions proposed in the prior art to address mechanical and acoustic impacts are very different. However structurally similar solutions for different energy sources are desirable.

SUMMARY OF THE INVENTION

The invention provides an energy absorbing structure for attenuating the energy received from an energy source comprising a deformable structure formed by an ensemble of one or more first layers of a material having a positive Poisson's ratio, one or more second layers of a material having a negative Poisson's ratio and one or more third layers of an elastomeric material placed between a first layer and a second layer. The ensemble must be arranged with one or more third layers joined to first and second layers for absorbing at least part of the energy through the shear forces or the combinations of traction and compression forces applied by the first and second layers as a consequence of their differential deformation after being submitted to an energy source.

The energy received by the energy absorbing structure can be the energy transmitted by a mechanical or an acoustic impact applied normal to the surface of the energy absorbing structure or mechanical or acoustic vibrations transmitted whether directly or by means of transmission elements to the energy absorbing structure.

In an embodiment the first and second layers are formed by a plurality of interconnected elements defining therebetween first and second hollow cells having, respectively, the form of regular hexagonal prisms and re-entrant hexagonal prisms.

In a group of embodiments the deformable structure is arranged in a rod-type manner between first and second load transmission elements.

In a group of embodiments the deformable structure is arranged in a membrane-type manner supported by first and second supporting elements.

In a group of embodiments the deformable structure is arranged in a plate-type manner supported by supporting elements.

In another embodiment the energy absorbing structure is arranged in a sandwich-type with two deformable structures and an inner core between them.

Other characteristics and advantages of the present invention will be clear from the following detailed description of embodiments illustrative of its object in relation to the attached drawings.

BRIEF DESCRIPTION OF THE DRAWINGS

FIG. 6a is a perspective view of a second cell of an energy absorbing structure according to the invention and FIG. 6b is a perspective view of the second cell after being subjected to a force F.

FIGS. 7a and 7b are sectional views of FIGS. 6a and 6b by plane A-A'.

FIGS. 15a, 16, 17, 18a are perspective views of membrane-type energy absorbing structures according to the invention. FIGS. 15b and 15c are perspective views of the cells shown in FIG. 15a before and after deformation. FIGS. 18b and 18c are perspective views of the cells shown in FIG. 18a before and after deformation.

DETAILED DESCRIPTION OF THE PREFERRED EMBODIMENTS

The Cells of the Deformable Structure

Figure 1A:
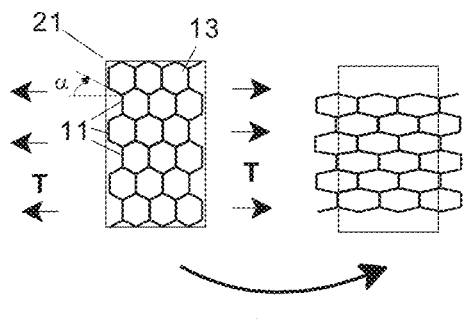
FIGS. 1a and 1b are cross-sectional views of bodies of two materials used in the structures of the present invention illustrating its different deformation behavior. In the material shown on FIG. 1a (positive Poisson's ratio), extension in the direction of arrows T produces contraction in a perpendicular direction while in the material shown on FIG. 2b (negative Poisson's ratio), extension in the direction of arrows T also produces extension in a perpendicular direction.

A typical cell 17 of the deformable structures used in the energy absorbing structures of the invention is formed by an ensemble of a layer 21 of a material having a positive Poisson's ratio (hereinafter a first layer 21), a layer 23 of a material having a negative Poisson's ratio (hereinafter a second layer 23) and a layer of an elastomeric material 25 (hereinafter a third layer 25) in between, being the third layer 25 joined to the first and second layers 21, 23.

In an embodiment, the first layer 21 has a honeycomb configuration in which their hollow cells 13 (see FIG. 1a) in the form of regular hexagonal prisms are delimited by a plurality of interconnected elements 11. An extension in the direction of arrows T produces a contraction in a perpendicular direction. A contraction in the direction of arrows T produces an extension in a perpendicular direction.

Moreover the second layer 23 has a honeycomb configuration in which their hollow cells 14 (see FIG. 1b) in the form of "re-entrant" hexagonal prisms are delimited by a plurality of interconnected elements 12. An extension in the direction of arrows T produces an extension in a perpendicular direction. A contraction in the direction of arrows T produces a contraction in a perpendicular direction.

Figure 1B:
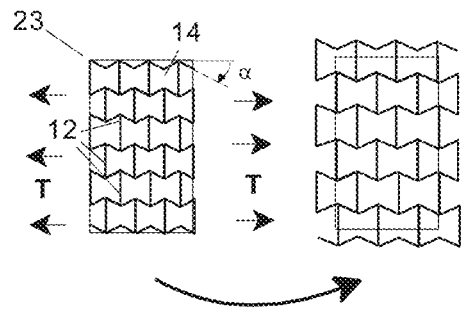
Figure 2A:
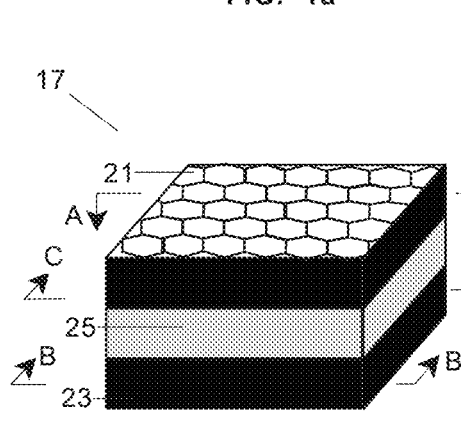
FIG. 2a is a perspective view of a first cell of a deformable structure according to the invention and FIG. 2b is a perspective view of the first cell after being subjected to a force F.
Figure 2B:
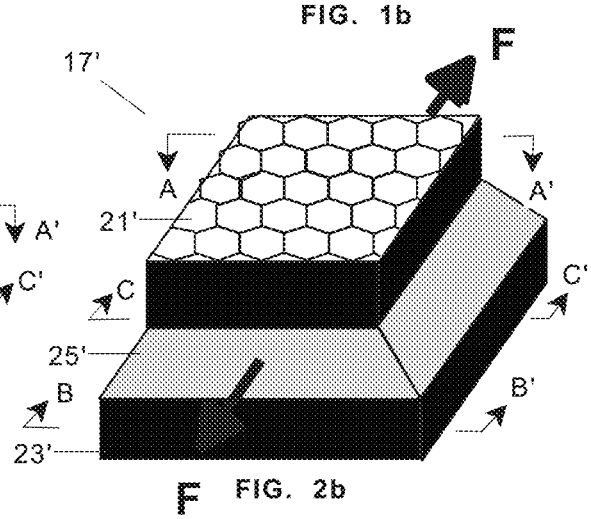
Figure 3A:
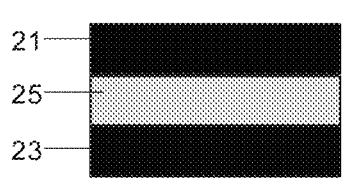
FIGS. 3a and 3b are sectional views of FIGS. 2a and 2b by plane A-A'.
Figure 3B:
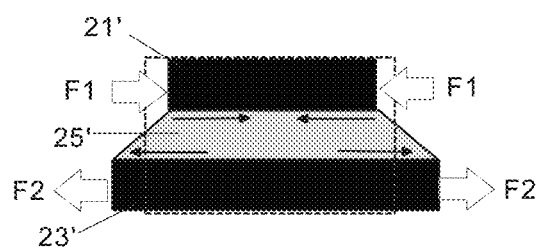
Figure 4A:
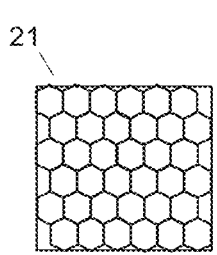
FIGS. 4a, 4b and 5a, 5b are sectional views of FIGS. 2a and 2b by planes B-B' and C-C'.
Figure 4B:
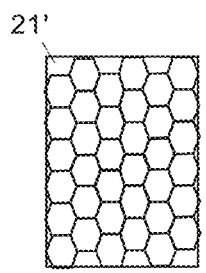
Figure 5A:
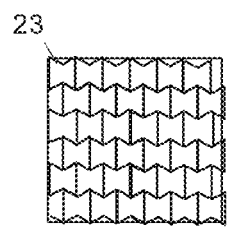
Figure 5B:
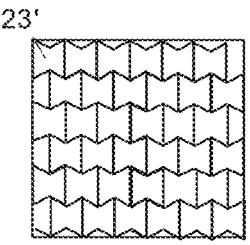

Poisson's ratio magnitude (positive or negative) of these layers 21, 23 depends on the angle α shown in FIGS. 1a, 1b and therefore their configuration can be adapted to the specific needs of the structure choosing a proper value for angle α.

When it is submitted to a force F produced by an energy source, the cell 17 changes to a deformed cell 17' (see FIGS. 2a-5b). The first layer 21 changes to a first deformed layer 21' extending in the direction of force F and contracting in a perpendicular direction. The second layer 23 changes to a second deformed layer 23' extending in the direction of the force F and also in a perpendicular direction. Consequently the third layer 25 changes to a third deformed layer 25' as a result of the shear forces (represented with single arrows in FIG. 3b) in opposite directions that occur in their interfaces with deformed layers 21', 23' absorbing part of the energy received by cell 17.

In the embodiment shown in FIGS. 6a-6b the cell 19 is similar to cell 17 except that the third layer is a discontinuous layer formed by two segments 25a, 25b instead of the continuous layer 25 of cell 17. With respect to cell 17, in cell 19 a larger part of the elastomeric layer is deformed by shear (in cell 17 the deformation of the middle part of the elastomeric layer is very small).

Rod-Type Energy Absorbing Structures

Within the meaning of this invention a rod-type energy absorbing structure is a deformable structure joined to first and second load transmission elements, one of them transmitting a force from an energy source, the other providing a reaction force.

In an embodiment (see FIG. 8a), the energy absorbing structure comprises a deformable structure 31 formed by an ensemble of planar first, second and third layers 21, 23, 25 joined to first and second load transmission elements 41, 43. The behavior of the energy absorbing structure under traction and compression forces is shown.

In another embodiment (see FIGS. 8b-8c), the energy absorbing structure comprises a deformable structure 32, formed by an ensemble of planar first and second layers 21, 23 and a discontinuous third layer formed by two segments 25a, 25b, joined to first and second load transmission elements 41, 43. The behavior of the energy absorbing structure under traction and compression forces is shown.

In another embodiment (see FIG. 9a), the energy absorbing structure comprises a deformable structure 33 formed by an ensemble of two planar first layers 21, three planar second layers 23 and four planar third layers 25 joined to first and second load transmission elements 41, 43. The behavior of the energy absorbing structure under compression forces is shown.

In another embodiment (see FIG. 9b), the energy absorbing structure comprises a deformable structure 33, formed by an ensemble of three planar first layers 21, two planar second layers 23 and four third planar layers 25, joined to first and second load transmission elements 41, 43. The behavior of the energy absorbing structure under traction forces is shown.

Figure 9A:
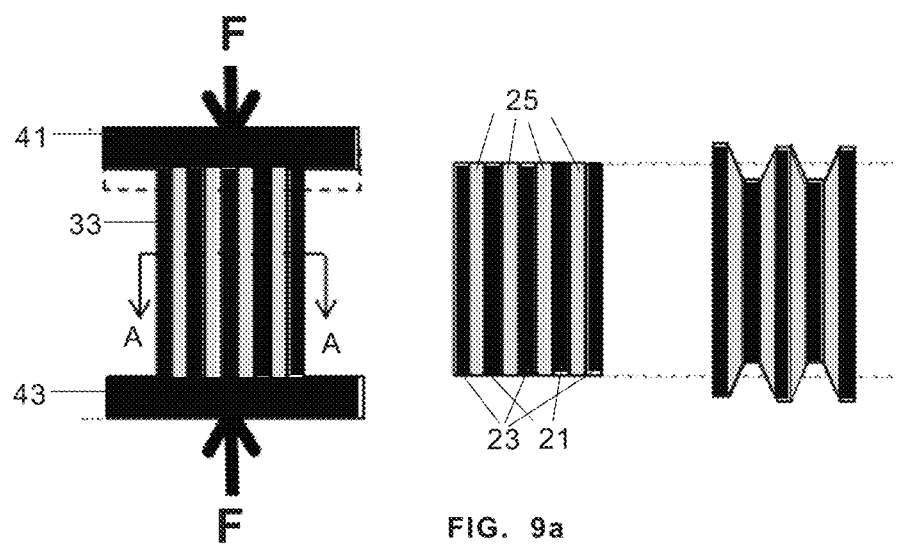
Figure 9B:
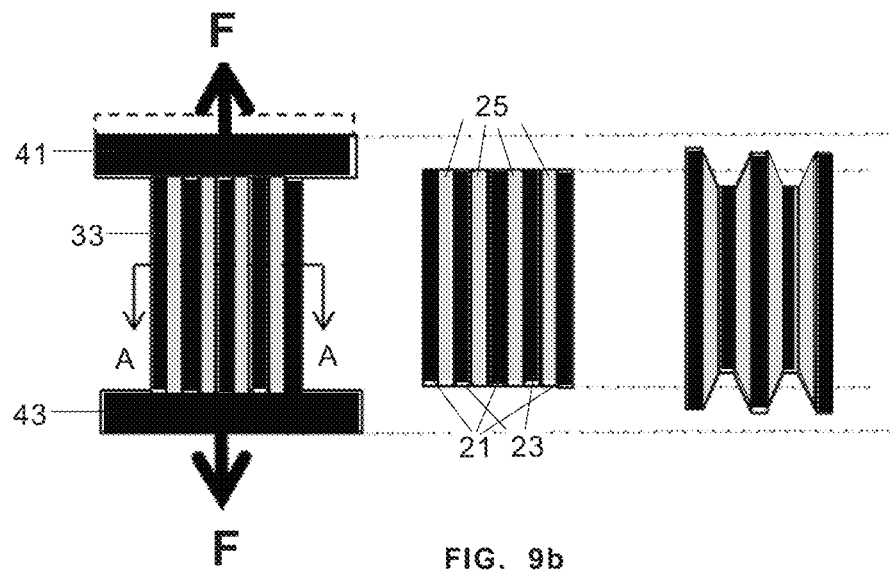
Figure 9C:
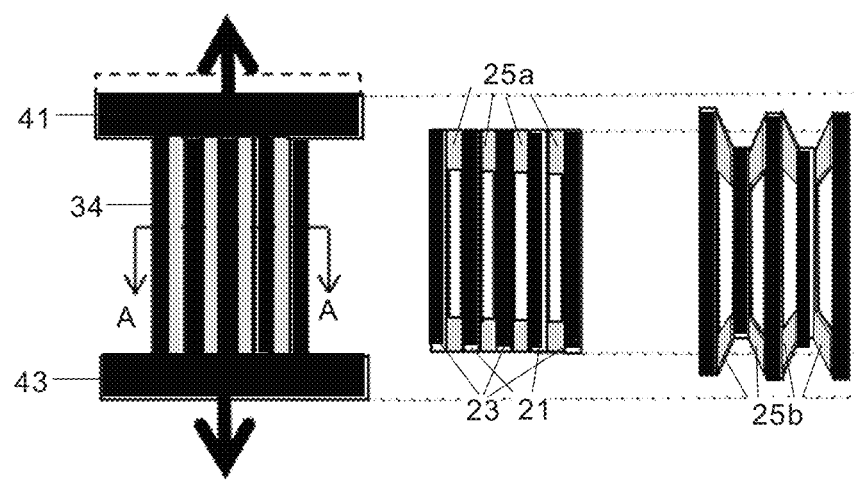
Figure 9D:
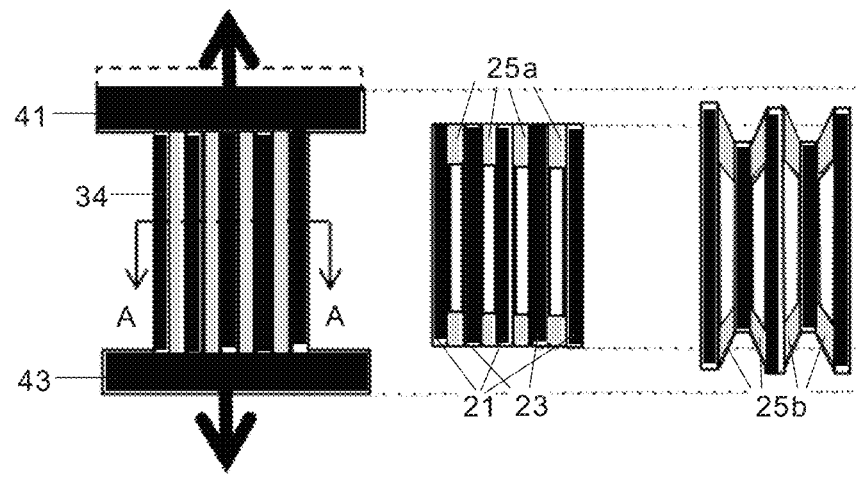

The embodiments illustrated in FIGS. 9c and 9d are similar to those shown in FIGS. 9a and 9b, substituting the continuous third layers 25 by discontinuous third layers formed by two segments 25a, 25b.

Figure 8B:
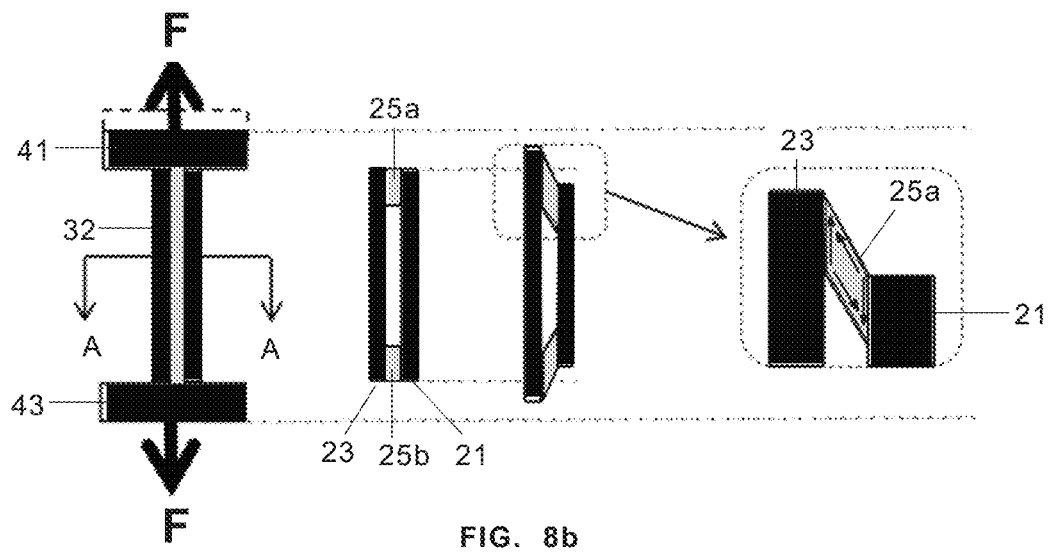
FIGS. 8a-10b are views of planar-shaped energy absorbing structures according to the invention arranged in a rod-like manner between first and second load transmission elements illustrating their deformations after being subjected to a force F in sectional views by the plane A-A.
Figure 8C:
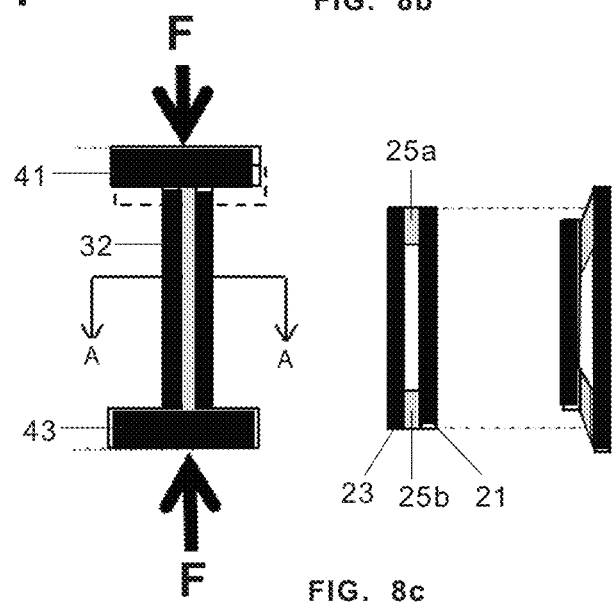

In the embodiments illustrated in FIGS. 9a to 9d, a larger amount of energy is dissipated on the elastomeric material than in the embodiments illustrated in FIGS. 8a-8c.

Figure 10A:
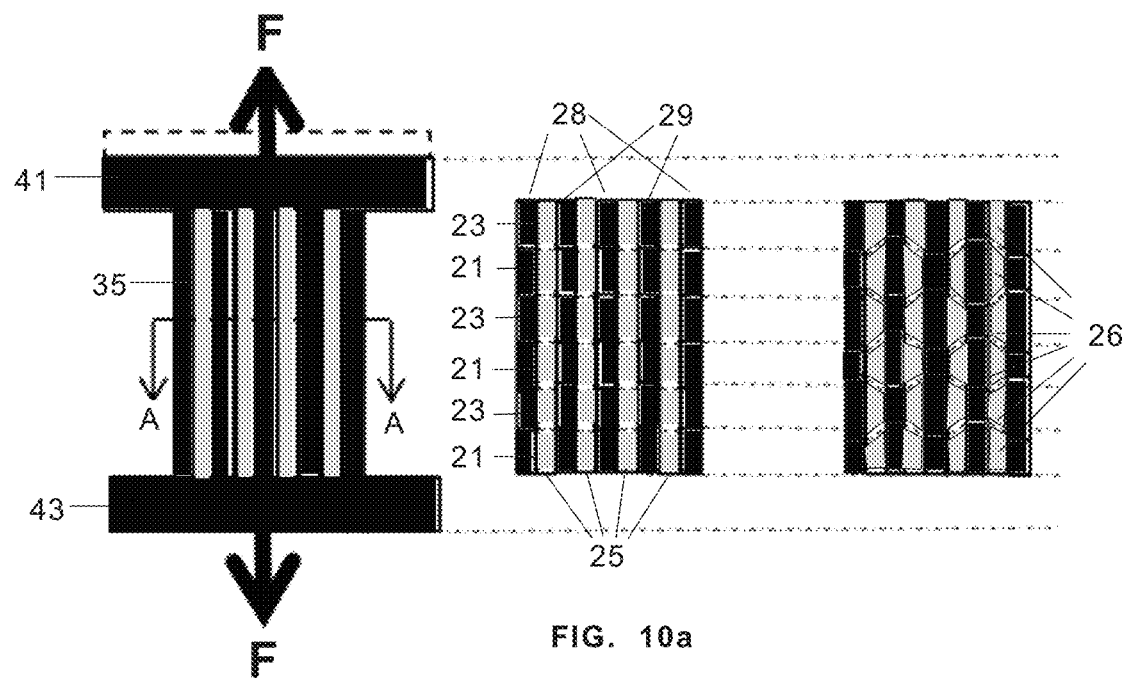
Figure 10B:
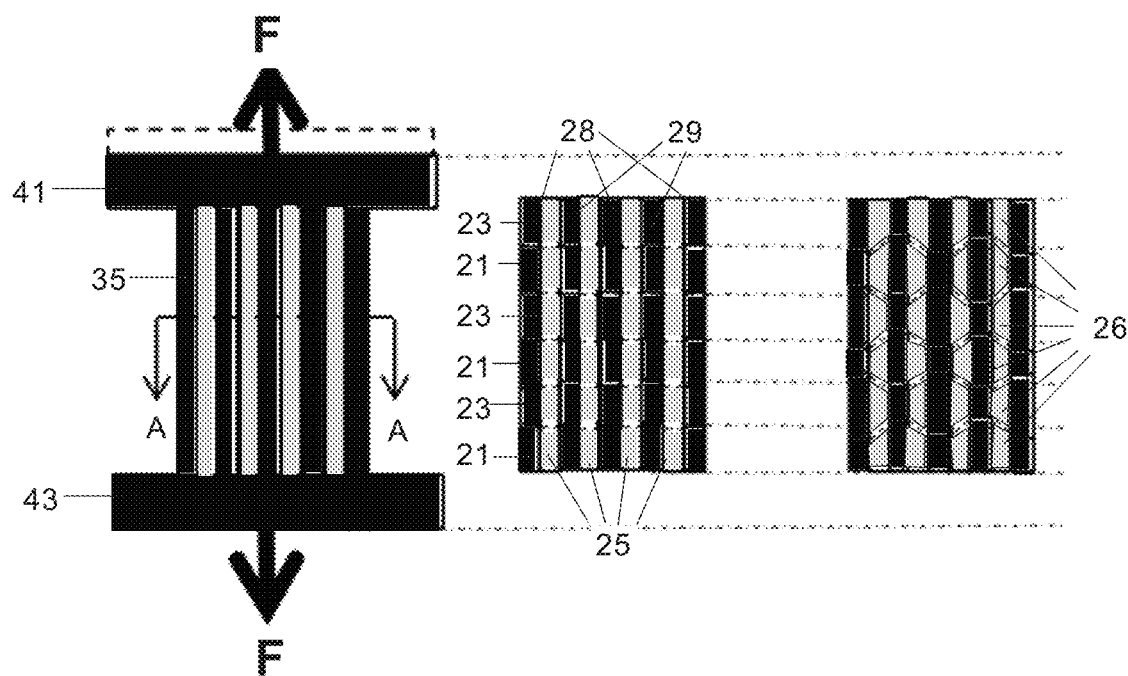

In another embodiment (see FIGS. 10a, 10b), the energy absorbing structure comprises a deformable structure 35 formed by plurality a of layers 28, 29 having alternated segments of the first and second layers 21, 23 and discontinuous third layers 25 having separated segments 26 joined at one side to a segment of a first layer 21 and at the other side to a segment of the second layer 23. The behavior of the energy absorbing structure under traction and compression forces is shown. It should be noted that in this case a large amount of energy is dissipated on the elastomeric material without external deformation.

Figure 11A:
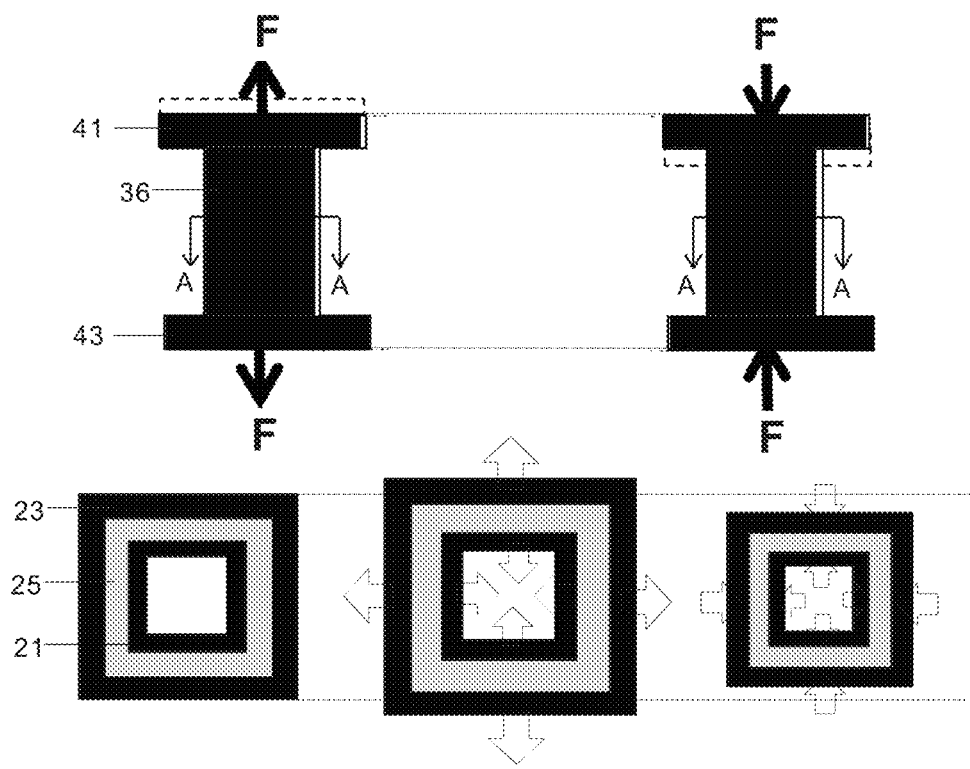
FIGS. 11a-13b are views of energy absorbing structures according to the invention having a closed section arranged in a rod-like manner between first and second load transmission elements including sectional views by the plane A-A illustrating their deformations after being subjected to a force F.
Figure 11B:
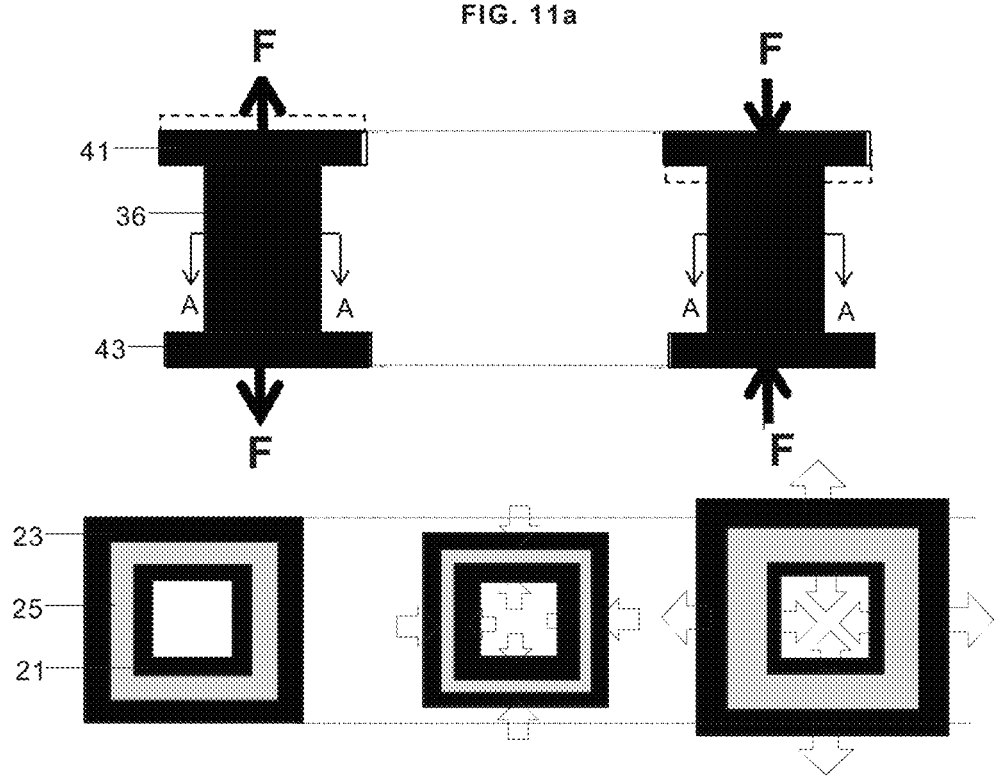

In another embodiment (see FIGS. 11a-11b), the energy absorbing structure comprises a deformable structure 36 formed by an ensemble of a box-shaped first layer 21 (whether the outer or the inner layer of the ensemble), a box-shaped third layer 25 and a box-shaped second layer 23 (whether the inner or the outer layer of the ensemble). As the deformable structure 36 has a close section, the deformation of the elastomeric material is due to a combination of traction and compression forces (not shear). The behavior of the energy absorbing structure under traction and compression forces is shown.

Figure 12A:
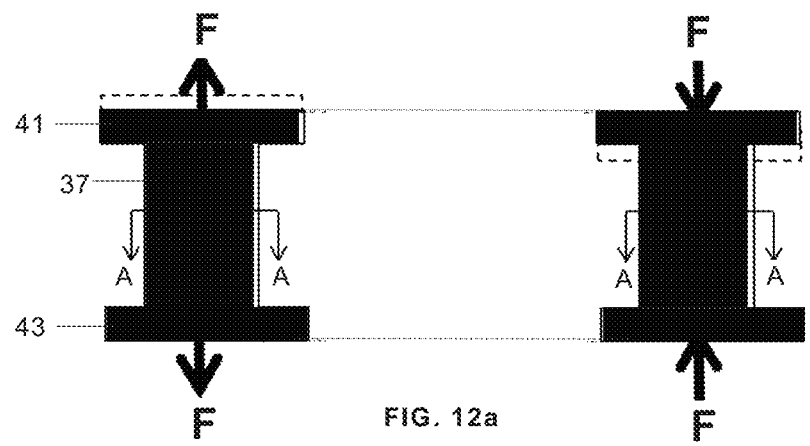
Figure 12B:
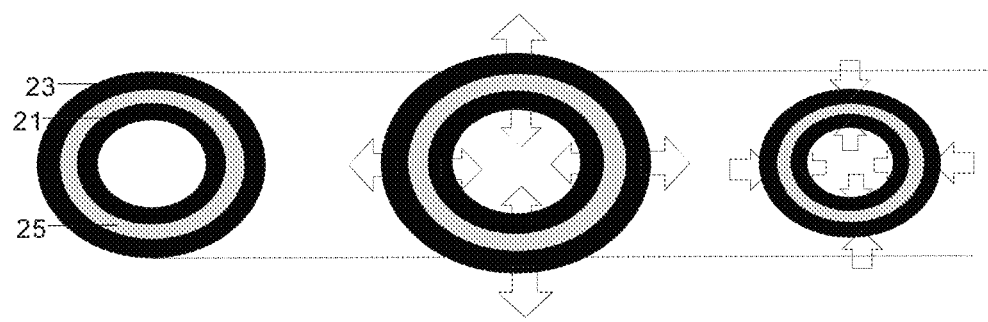

In another embodiment (see FIGS. 12a-12b) the energy absorbing structure comprises a deformable structure 37 formed by an ensemble of a tubular-shaped second layer 23 as the outer layer of the ensemble, a tubular-shaped third layer 25 as the intermediate layer and a tubular-shaped first layer 21 as the inner layer of the ensemble. The behavior of the energy absorbing structure under traction and compression forces is shown.

Figure 13A:
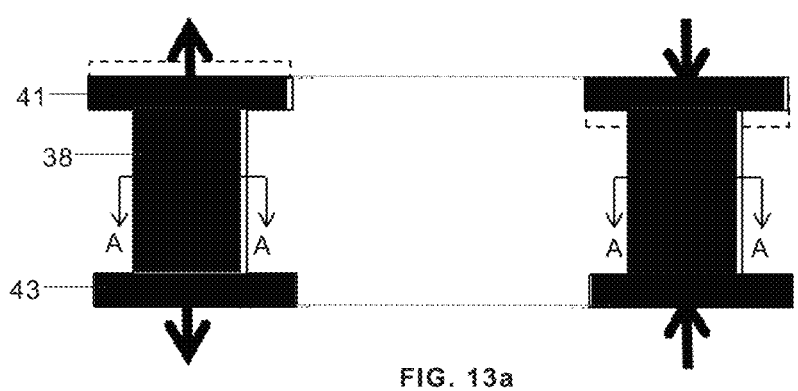
Figure 13B:
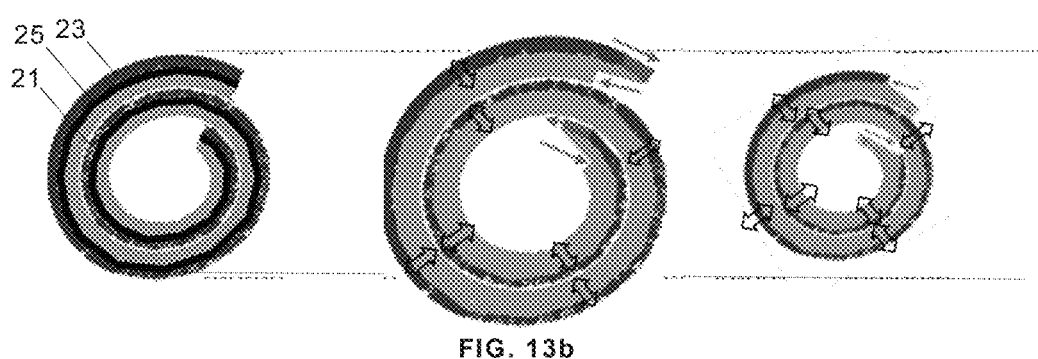

In another embodiment (see FIGS. 13a-13b) the energy absorbing structure comprises a deformable structure 38 formed by an ensemble of a rolled-shaped second layer 23 as the outer layer of the ensemble, a rolled-shaped third layer 25 as the intermediate layer and a rolled-shaped first layer 21 as the inner layer of the ensemble. The rolled section of the layers causes that the deformation of the elastomeric material is a combination of traction, compression and shear providing additional energy absorption.

Figure 14A:
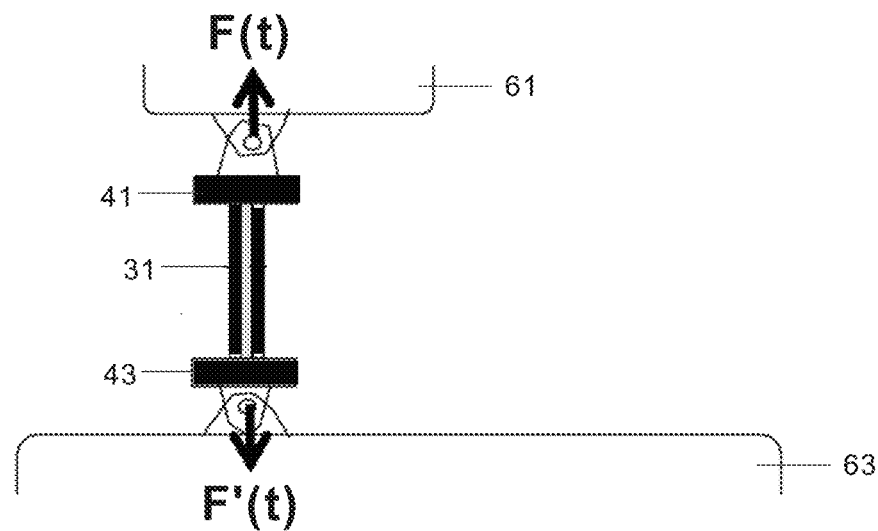
FIGS. 14a-14c are schematic sectional views of aeronautic structures including energy absorbing structures according to the invention.

As an industrial example of the above mentioned structures, FIG. 14a shows a rod-type energy absorbing structure formed by a deformable structure 31 joined to first and second load transmission elements 41, 43 respectively connected to an aircraft engine 61 and to an aircraft supporting structure 63. The deformable structure 31 is subjected to a force F(t) due to any cause (for example a mechanical impact) and will absorb part of it so that the output force F'(t) transmitted to the aircraft supporting structure is acceptable. In other words, if the value of the transmissibility factor Tr=F'(t)/F(t) (that depends of the features of the deformable structure) is acceptable. Knowing the range of variation of F(t), a suitable deformable structure (whether the above-mentioned deformable structure 31 or other deformable structure according to this invention) can be selected to achieve the desired transmissibility factor Tr.

Figure 14B:
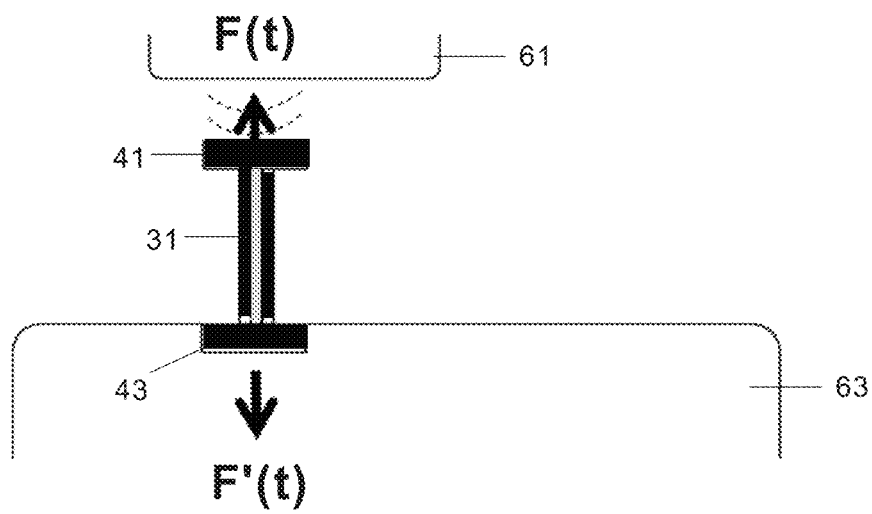

FIG. 14b shows another industrial example where the deformable structure 31 is joined to first and second load transmission elements 41, 43. The transmission element 43 is joined to the aircraft supporting structure 63 and the transmission element 41 is close to an aircraft engine 61. The deformable structure 31 is subjected to a force F(t) due to a mechanical or an acoustic vibration caused by the aircraft engine 61.

Figure 14C:
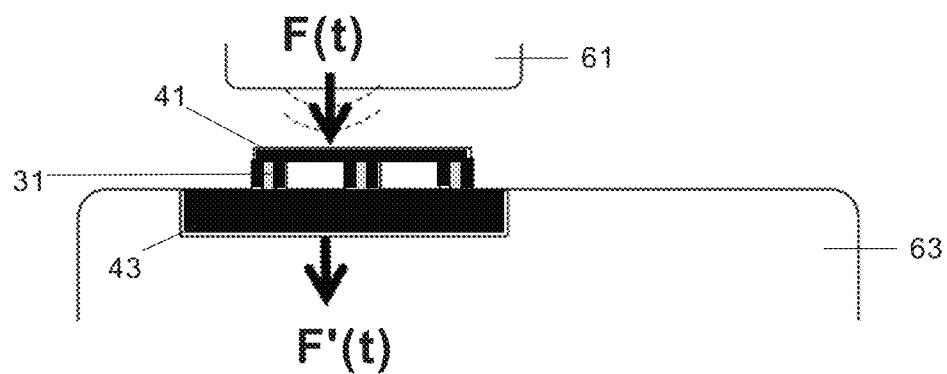

FIG. 14c shows another industrial example where a set of three deformable structures 31 is joined to first and second load transmission elements 41, 43. The transmission element 43 is joined to the aircraft supporting structure 63 and the transmission element 41 is close to an aircraft engine 61. The three deformable structures 31 are subjected to a force F(t) due to a mechanical or an acoustic vibration caused by the aircraft engine 61.

The above-mentioned deformable structure 31 (and similarly other deformable structures) can therefore be used as a passive vibration dumping device for a system such as aircraft exposed to vibrations. In that case, the stiffness and the mass of the three layers of the deformable structure 31 can be tuned in order that the ensemble off such layers resonates for one or more target frequencies, so that when the system is excited by such frequencies, the deformation of the three layers will be increased and the elastomeric material will absorb a big part of the energy associated with those target frequencies. The deformable structure 31 acts, therefore, as a sink of energy that is removed from the aircraft to be protected, avoiding the undesirable effects that such vibrations could make to the aircraft.

One advantage of the rod-type energy absorbing structures of the invention, with regard to conventional elastomeric structures, is that the main loads pass through the first and second layers 21, 23 of the deformable structure and not through the elastomeric layers 25, so that the strength is not limited by the elastomeric material.

Another advantage is that it is possible to define the section and the material and angle of orientation of the first and second layers 21, 23, as well as the section and material of the third layers 25 for each specific rigidity, strength and dumping requirement.

Membrane & Plate-Type Energy Absorbing Structures

Within the meaning of this invention, a membrane-type energy absorbing structure is a deformable structure supported by first supporting elements in the direction of the expected force actuating on it, and second supporting elements in a perpendicular direction arranged in its corners.

In the membrane-type energy absorbing structures shown in FIG. 15a and FIG. 16, the deformable structure 51 is supported by first and second supporting elements 65, 67. The deformable structure 53 is formed by a first planar layer 21, a second planar layer 23 and a third planar layer 25 between them.

When subjected to a force F(t), due to any of the above-mentioned causes, the structure flexes and absorbs energy due the differential deformation of its layers (see in FIGS. 15b, 15c the change of cell 17 to a deformed cell 17').

In the membrane-type energy absorbing structure shown in FIG. 17, the deformable structure 52, also supported by first and second supporting elements 65, 67, is formed by two segments of a planar first layer 21 and central segment of a planar second layer 23 as the upper layer, a third layer 25 as the intermediate layer and two segments of a planar second layer 23 and a segment of a planar first layer 21 as the lower layer.

The deformable structure of 53 of the membrane-type energy absorbing structure shown in FIGS. 18a-18c is similar to that shown in FIGS. 15a-15b, changing the continuous third layer 25 for a discontinuous layer formed by two segments 25a, 25b.

Within the meaning of this invention, a plate-type energy absorbing structure is a deformable structure supported by supporting elements in the direction of the expected force actuating on it.

Figure 19A:
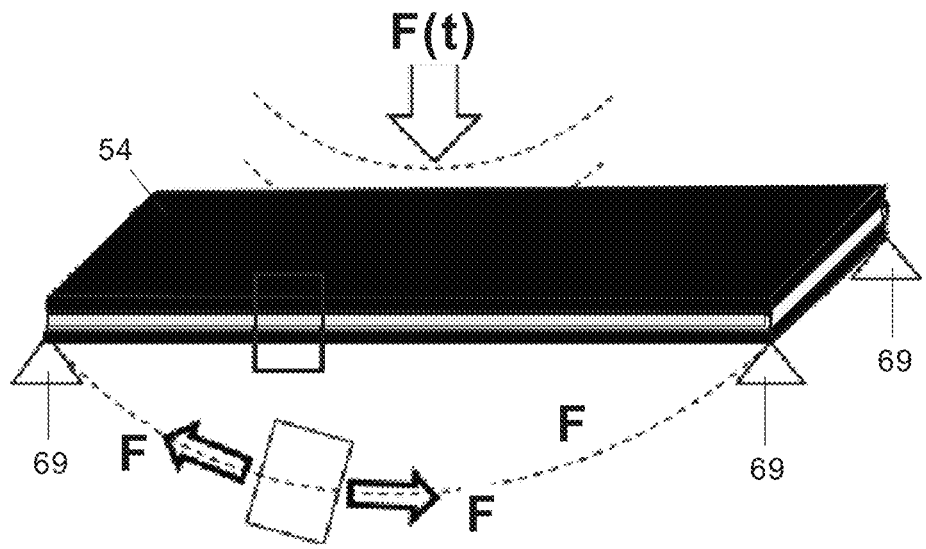
FIGS. 19a and 19b are perspective views of plate-type energy absorbing structures according to the invention.
Figure 19B:
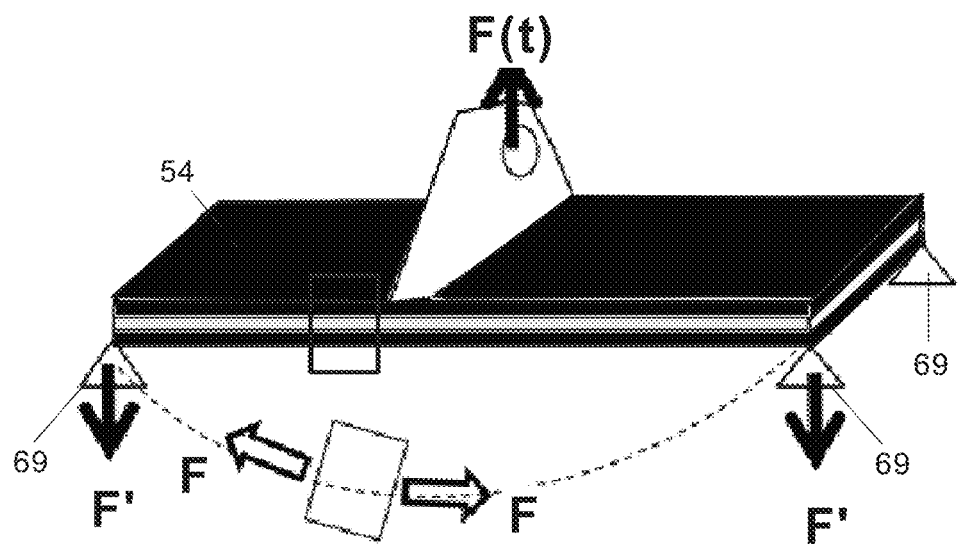

In the plate-type energy absorbing structure shown in FIGS. 19a and 19b, the deformable structure 54 is supported by supporting elements 69 arranged in its corners. The deformable structure 53 is formed by a first planar layer 21, a second planar layer 23 and a third planar layer 25 between them.

When subjected to a force F(t), due to any of the above-mentioned causes, the structure flexes and absorbs energy due the differential deformation of its layers.

Sandwich-Type Energy Absorbing Structures

Figure 20A:
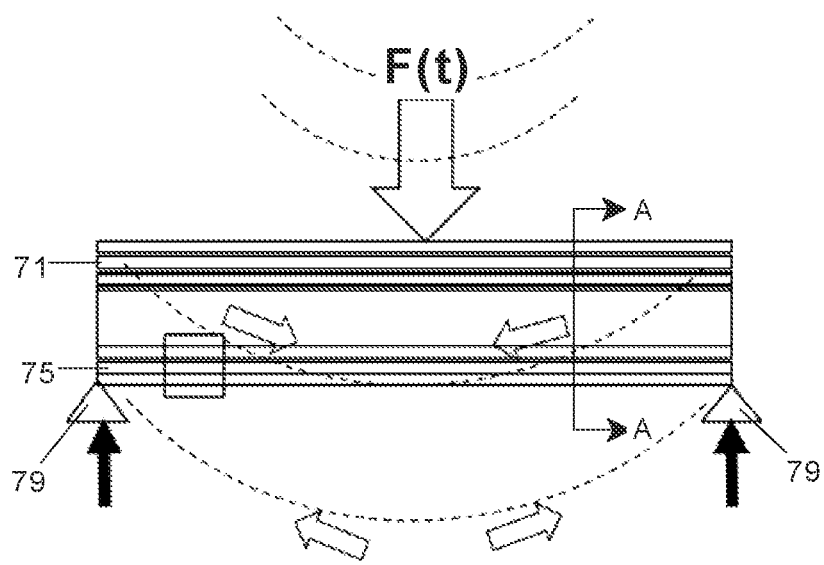
FIG. 20a is a sectional view of a sandwich-type energy absorbing structure according to the invention and FIGS. 20b and 20c are sectional views of FIG. 20a by plane A-A illustrating two embodiments of the sandwich core.
Figure 20B:
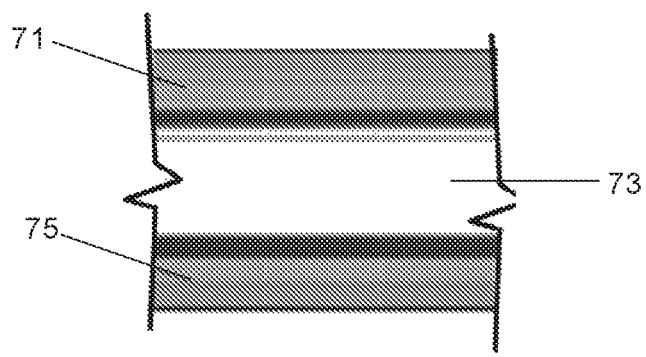
Figure 20C:
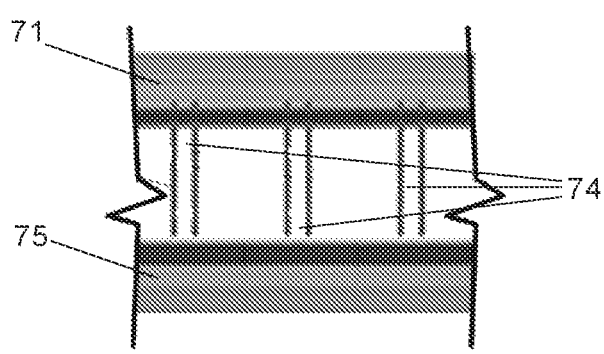

Within the meaning of this invention, a sandwich type energy absorbing structure comprises two deformable structures 71, 75 and an intermediate inner core between them, such as a honeycomb or foam core 73 or alternatively formed by intermediate shear webs structure core 74, and supporting elements 79 (see FIGS. 20a-20c).

Any of the above-mentioned planar deformable structures can be used as a deformable structure 71 or 75.

Although the present invention has been described in connection with various embodiments, it will be appreciated from the specification that various combinations of elements, variations or improvements therein may be made, and are within the scope of the invention as defined by the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An energy absorbing structure for attenuating energy received from an energy source, comprising a deformable structure formed by an ensemble of:
   one or more first layers of a material having a positive Poisson's ratio, the one or more first layers each comprising a plurality of interconnected elements defining therebetween first hollow cells, wherein a plurality of first hollow cells are adjacent to first hollow cells in both a first direction and a second direction, the first direction and the second direction orthogonal to each other;
   one or more second layers of a material having a negative Poisson's ratio, the one or more second layers each comprising a plurality of interconnected elements defining therebetween first hollow cells, wherein a plurality of second hollow cells are adjacent to second hollow cells in both the first direction and the second direction; and
   one or more third layers of an elastomeric material placed between a first layer comprising the first hollow cells and a second layer comprising the second hollow cells;
   the ensemble being arranged with the one or more third layers joined to the one or more first and second layers for absorbing at least part of said energy through shear forces or a combination of traction and compression forces applied to the ensemble by the first and second layers as a consequence of their differential deformation after receiving said energy.

2. The energy absorbing structure according to claim 1, wherein said energy source is at least one of the following: a mechanical impact, an acoustic impact, a mechanical vibration, and an acoustic vibration.

3. The energy absorbing structure according to claim 1, wherein the first hollow cells have the form of regular hexagonal prisms and the second hollow cells have the form of re-entrant hexagonal prisms.

4. The energy absorbing structure according to claim 1, wherein the deformable structure is arranged in a rod-type manner between first and second load transmission elements.

5. The energy absorbing structure according to claim 4, wherein the deformable structure is formed by an ensemble of a planar first layer, a planar third layer and a planar second layer.

6. The energy absorbing structure according to claim 4, wherein the deformable structure is formed by an ensemble of a planar first layer, a discontinuous planar third layer formed by two segments and a planar second layer.

7. The energy absorbing structure according to claim 4, wherein the deformable structure is formed by an ensemble of two or three planar first layers, three or two planar second layers and four planar third layers.

8. The energy absorbing structure according to claim 4, wherein the deformable structure is formed by an ensemble of two or three planar first layers, three or two planar second layers and four discontinuous planar third layers formed by two segments.

9. The energy absorbing structure according to claim 4, wherein the deformable structure comprises a plurality of layers formed by alternated segments of first and second layers joined between them and discontinuous layers of an elastomeric material between said layers formed by separated segments joined at each side to a segment of a different layer of said first and second layers.

10. The energy absorbing structure according to claim 4, wherein the deformable structure is formed by an ensemble of a first layer, a third layer and a second layer configured with a close section.

11. The energy absorbing structure according to claim 10, wherein the deformable structure is formed by an ensemble of a box-shaped first layer, a box-shaped third layer and a box-shaped second layer.

12. The energy absorbing structure according to claim 10, wherein the deformable structure is formed by an ensemble of a tubular-shaped first layer, a tubular-shaped third layer and a tubular-shaped second layer.

13. The energy absorbing structure according to claim 10, wherein the deformable structure is formed by an ensemble of a rolled-shaped first layer, a rolled-shaped third layer and a rolled-shaped second layer.

14. The energy absorbing structure according to claim 1, wherein the deformable structure is an ensemble of a planar first layer as the upper layer, a planar second layer as the lower layer and a planar third layer as the intermediate layer supported by first and second supporting elements for acting as a membrane that receives the energy transmitted by an energy source on its upper layer.

15. The energy absorbing structure according to claim 14, wherein the planar third layer is a continuous layer.

16. The energy absorbing structure according to claim 14, wherein the planar third layer is a discontinuous layer formed by two segments.

17. The energy absorbing structure according to claim 1, wherein the deformable structure is an ensemble of an upper layer formed by two segments of a planar first layer and a segment of a planar second layer, a lower layer formed by two segments of a planar second layer and a segment of a planar first layer, and a planar third layer as the intermediate layer, supported by first and second supporting elements to act as a membrane that receives the energy transmitted by an energy source on its upper layer.

18. The energy absorbing structure according to claim 1, wherein the deformable structure is an ensemble of a planar first layer as the upper layer, a planar second layer as the lower layer and a planar third layer as the intermediate layer supported by supporting elements for acting as a plate that receives the energy transmitted by an energy source on its upper layer.

19. The energy absorbing structure according to claim 18, wherein the planar third layer is a continuous layer.

20. The energy absorbing structure according to claim 18, wherein the planar third layer is a discontinuous layer formed by two segments.

21. The energy absorbing structure according to claim 1, comprising an ensemble of two deformable structures and an inner core between them supported by supporting elements.

22. The energy absorbing panel according to claim 21, wherein the inner core is a honeycomb or a foam core.

23. The energy absorbing panel according to claim 21, wherein the inner core is an intermediate shear web structure core.

* * * * *